Figure 1:
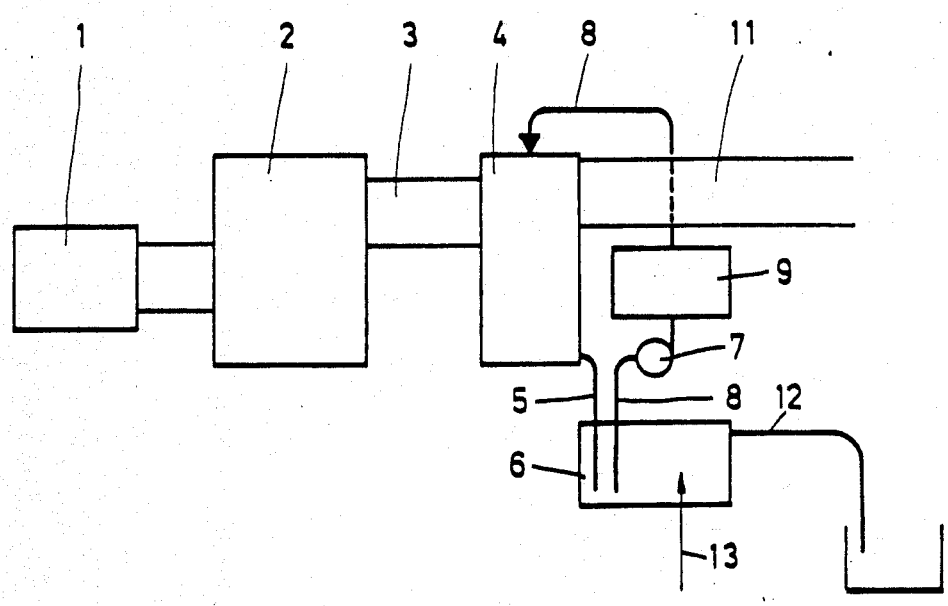

United States Patent [19]
Farago et al.

[11] Patent Number: 4,692,319
[45] Date of Patent: Sep. 8, 1987

[54] METHOD FOR DESULFURIZING FLUE GAS IN FUEL OIL FIRING SYSTEMS

[75] Inventors: Zoltan Farago, Adelsheim-Sennfeld; Winfried Buschulte, Neuenstadt, both of Fed. Rep. of Germany

[73] Assignee: Deutsche Forschungs- und Versuch-Sanstalt für Luft- und Raumfahrt E.V., Bonn, Fed. Rep. of Germany

[21] Appl. No.: 691,162

[22] Filed: Jan. 14, 1985

[30] Foreign Application Priority Data

Jan. 18, 1984 [DE] Fed. Rep. of Germany ....... 3401471

[51] Int. Cl.⁴ ................................. C01B 17/00
[52] U.S. Cl. .................................. 423/242; 423/555
[58] Field of Search .......... 423/242 A, 242 R, 244 A, 423/244 R, 166, 555

[56] References Cited

U.S. PATENT DOCUMENTS 2,090,142  8/1937  Nonhebel et al. .................. 423/242
4,048,287  9/1977  Kelleher et al. .................... 423/242

FOREIGN PATENT DOCUMENTS 2755252  7/1979  Fed. Rep. of Germany .
3103399  8/1982  Fed. Rep. of Germany .

Primary Examiner—Gregory A. Heller
Attorney, Agent, or Firm—Kenway & Jenney

[57] ABSTRACT

The invention relates to a method and apparatus for desulfurizing flue gas in fuel oil firing systems comprising a residual heat exchanger forming an acid condensate. A neutralizing agent is added to the acid condensate and the neutralized condensate recirculated to the residual heat exchanger for the purpose of dissolving sulfur dioxide. The apparatus for carrying out this method in a fuel oil firing system comprising a residual heat exchanger and a collecting tank for the condensate is provided with a pump and a tank filled with neutralizing agent which are both disposed in a condensate recirculation conduit leading from the collecting tank to the residual heat exchanger.

5 Claims, 4 Drawing Figures

METHOD FOR DESULFURIZING FLUE GAS IN FUEL OIL FIRING SYSTEMS

The invention relates to a method for desulfurizing flue gas in fuel oil firing systems comprising a residual heat exchanger forming an acid condensate. In addition, the invention relates to apparatus for carrying out this method in a fuel oil firing system comprising a residual heat exchanger and a collecting tank for the condensate issuing from the residual heat exchanger.

It is known, in principle, to desulfurize flue gases in firing systems. The sulfur which is present as $SO_2$ can, for example, be washed out (e.g. with ammonia or soda lye) whereby $SO_2$ or sulfate, e.g. in the form of gypsum, may be recovered. The known desulfurizing methods are used only in large industrial firing systems and are not suitable for small fuel oil firing systems, in particular household fuel oil firing systems comprising a residual heat exchanger.

The object of the invention is to provide a method for desulfurizing flue gas in fuel oil firing systems comprising a residual heat exchanger forming an acid condensate wherein desulfurization is suitable, in particular, for household fuel oil firing systems of this type.

The object is solved by the inventive method in that a neutralizing agent is added to the condensate and the neutralized condensate is recirculated to the residual heat exchanger for the purpose of dissolving sulfur dioxide. An apparatus for carrying out this method is characterized in that a pump and a tank filled with neutralizing agent are arranged in a condensate recirculation conduit leading from the condensate collecting tank to the residual heat exchanger.

Figure 2:
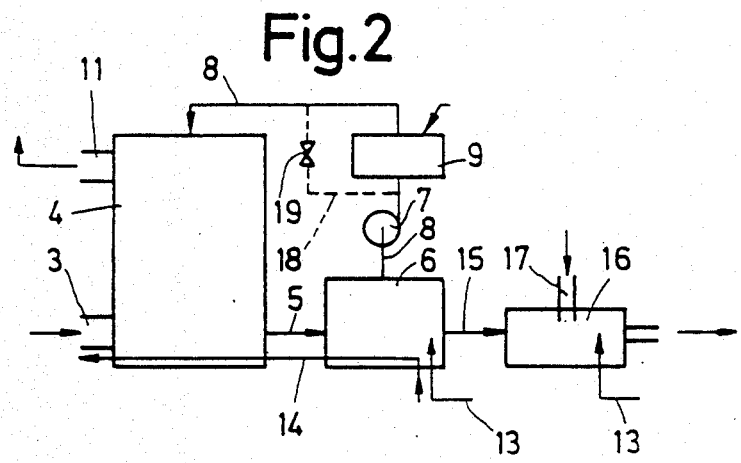
Figure 3:
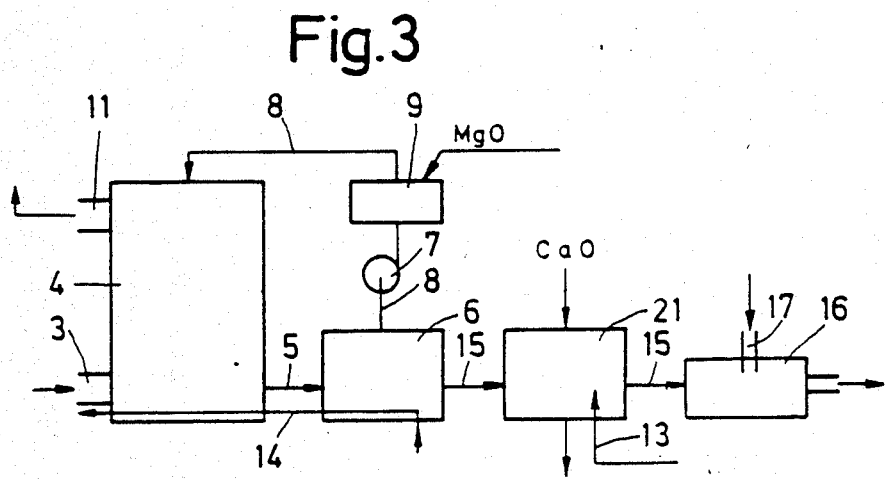
Figure 4:
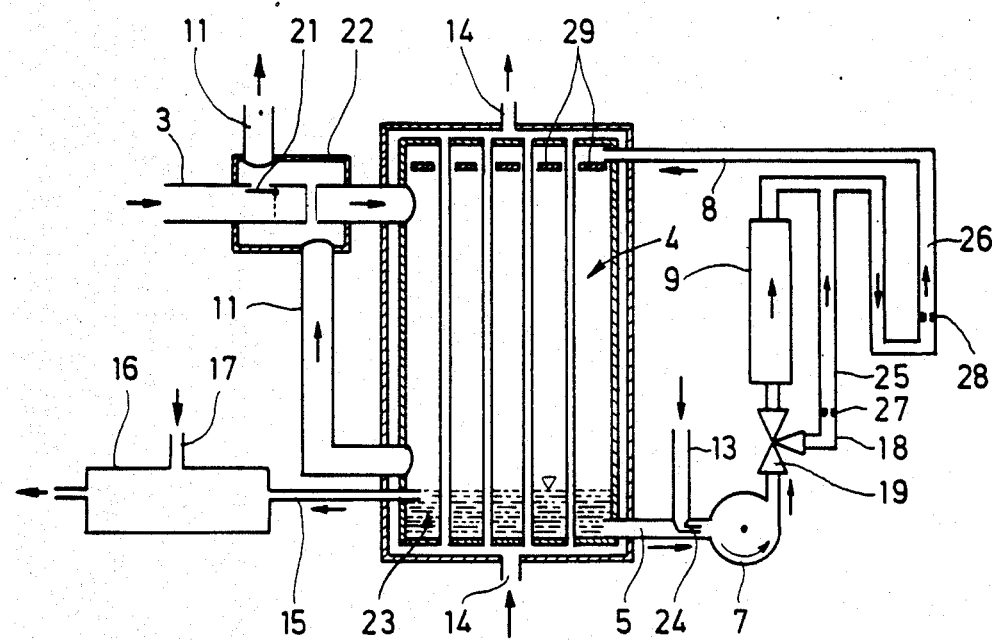

The following description of preferred embodiments of the invention serves to explain the invention in greater detail in conjunction with the attached drawings, in which FIG. 1 is a schematic illustration of a fuel oil firing system with a residual heat exchanger and flue gas desulfurization;

FIG. 2 is a schematic illustration of a modified apparatus for desulfurizing flue gas, in particular for household fuel oil firing systems and FIGS. 3 and 4 show apparatuses for desulfurizing flue gas which are further modified in comparison with FIG. 2.

When burning fuel oil EL with a sulfur content of about 0.3%, as used in particular in household oil-firing systems, about 3% of the sulfur contained in the fuel oil burns to form $SO_3$, when the excess air is equivalent to $\lambda = 1.05$, and the remaining 97% to form $SO_2$. In fuel oil firing system comprising a residual heat exchanger which is connected to the outlet side of the boiler and has flue gas flowing therethrough, a condensate forms in the residual heat exchanger. The $SO_3$ contained in the flue gas dissolves in this condensate and shifts the pH value to about 2.5, i.e. into a very acid range. As a result of this pH value and the low partial pressure of the $SO_2$, only about 1% of the $SO_2$ in the condensate may be washed out.

The principle of the inventive method is to be seen in the fact that the pH value of the condensate is raised accordingly for the purpose of washing out a higher percentage of $SO_2$. In this respect, a neutralizing agent is continually added to the condensate and the neutralized condensate recirculated to the residual heat exchanger to dissolve sulfur dioxide. The pH value of the neutralized condensate may be between 5 and 8, preferably between 7 and 7.5, in particular 7.5. It has been found that, in this way, up to more than 70% of the sulfur dioxide in the condensate may be dissolved when the condensate has a pH value of, for example, about 7.5. The sulfate concentration in the condensate then amounts to 4000 to 5000 mg/l. When the sulfate-containing condensate is diluted with water, in particular waste water, by about 10 to 15 times, the condensate may be passed without risk to the public sewerage system and so the flue gas desulfurization described is particularly suitable for household firing systems.

FIG. 1 is a schematic illustration of an apparatus for carrying out the desulfurizing method described. A fuel oil burner 1 heats a conventional water boiler 2, for example of a hot-water central heating system. The sulfurous flue gas issuing from the boiler 2 via a conduit 3 flows through a residual heat exchanger 4 in order to improve the energy balance in a manner known per se. The flue gas is cooled in the residual heat exchanger to, for example, about 30° to 35° C. The heat given off is passed, for example, to water flowing back in a heating return conduit and thereby utilized. During cooling of the flue gas to the lower temperature specified, about 850 to 1000 ml of water are condensed per kilogram of fuel oil and form a so-called "condensate". This condensate flows through a conduit 5 out of the residual heat exchanger 4 and into a collecting tank 6. The $SO_3$ contained in the flue gas has dissolved in the condensate and this causes the condensate to have a pH value of 2.5. The acid condensate is withdrawn from the collecting tank 6 by a pump 7 and returned to the residual heat exchanger via a recirculation conduit 8. This conduit comprises a tank 9 filled with neutralizing agent. The acid condensate is neutralized by the neutralizing agent in the tank 9 and thus has a pH value of 7.5, for example, when it flows back into the residual heat exchanger 4 and is therefore alkaline. At least 70% of the $SO_2$ contained in the flue gas dissolves in the recirculated neutralized condensate and is washed out in this way. The cooled flue gas which is sulfur-free passes out into the atmosphere via a conduit 11 (and a chimney which is not illustrated).

The residual heat exchanger 4 is adapted in the conventional manner to the condensate recirculation and thus acts as a gas purifier. For this purpose, it contains a conventional condensate distributor in order to ensure that the condensate is sprayed uniformly onto the heat exchanger surfaces which is necessary for washing out $SO_2$. In household fuel oil firing systems, a condensate volume flow of about 30 to 40 l/h is, for example, advantageous.

The collecting tank 6 is equipped with a conventional overflow means, via which excess sulfurous condensate flows off through a conduit 12. Moreover, the sulfite which first ensues from the $SO_2$ can be converted to harmless sulfate in the collecting tank 6. This conversion may be accelerated by introducing air into the tank 6 via a conduit 13.

The tank 9 preferably contains, as neutralizing agent, MgO, CaO and NaOH although other agents are also suitable for the specified purpose.

FIG. 2 shows an apparatus for desulfurizing flue gas, in particular in household fuel oil firing systems, which is somewhat modified with respect to FIG. 1. Corresponding parts have been given the same reference numerals. FIG. 2 shows, in addition, a conventional heating return 14 which is guided through both the residual heat exchanger 4 and the collecting tank 6 to exploit residual heat to the full. As also illustrated in FIG. 2, the sulfurous condensate passes from the collecting tank 6 via a conduit 15 to a buffer tank 16. Air may be supplied to both the collecting tank 6 and the buffer tank 16 via a conduit 13 for improving the sulfite to sulfate conversion. Household waste water is fed to the buffer tank 16 via a conduit 17. This dilutes the sulfurous condensate in the tank 16 to such an extent that it is possible to pass the sulfate-containing condensate into the public sewerage system. The permitted amounts of sulfate concentration in waste water are, for example, between 400 and 600 mg/l. If, as shown in FIG. 2, magnesium oxide or a sodium compound, e.g. $Na_2O$, NaOH or $Na_2CO_3$, is used as neutralizing agent, dissolved magnesium or sodium sulfate is passed to the sewerage system.

As illustrated in FIG. 2 by broken lines, part of the recirculating condensate can, in a modified embodiment, be guided around the neutralizing tank 9 via a bypass conduit 18. The bypass conduit 18 contains a controllable or adjustable valve 19. In this way, the pH value of the recirculating condensate can be adjusted or regulated to a specific value. During operation in the acid range, i.e. at a pH value of between 5 and 5.5, the conversion of $SO_2$ to sulfate may be accelerated without any addition of air.

In principle, the system may operate at pH values of the condensate of between 5 and 8. If acid condensate is recirculated, the residual heat exchanger 4 must be made of high-grade steel or another corrosion-resistant material. If the system is operated in the neutral or alkaline range, for example at a pH value of 7.5, the residual heat exchanger 4 may consist of standard-grade steel. This is of considerable importance with a view to production costs for the residual heat exchanger 4 and in particular with a view to conventional firing systems without condensate recirculation, in which the residual heat exchanger 4 must also be made of high-grade steel or the like on account of the acid condensate passing therethrough.

When the neutralizing agent used is magnesium oxide it is unnecessary to meter the neutralizing agent as a function of the pH value. An adjustment or regulation of the pH value is, however, recommended when a water-soluble neutralizing agent, for example caustic soda, is used.

In the apparatus illustrated in FIG. 3, which corresponds to a large extent to the apparatus of FIG. 2, a sulfate separator 21 is arranged in the conduit 15 between collecting tank 6 and buffer tank 16. Air may again be supplied to this separator via a conduit 13. By adding, for example, CaO, lime solution or $Ca(OH)_2$ to the sulfate separator 21, insoluble calcium sulfate (gypsum) and magnesium hydroxide will be formed. These substances separate out and so no or considerably less sulfate will, in this case, be present in the waste water.

A main advantage of the invention is the fact that desulfurization and utilization of residual heat may take place in one and the same device, namely the residual heat exchanger 4. The condensate may be neutralized by using a cheap neutralizing agent, in particular magnesium oxide. If the condensate is neutralized into the alkaline range, it is then possible to use cheaper ferritic materials (standard-grade steel) for the production of the residual heat exchanger 4 instead of the expensive austenitic material (high-grade steel) previously used. Another big advantage is the fact that the sulfates contained in the condensate do not need to be eliminated but may be passed into the public sewerage system after being diluted with water. This is especially favourable for household firing systems. It is then advantageous to dilute the sulfate-containing condensate with household waste water. Finally, it is to be noted that the total heat balance of the apparatus is not impaired by the addition of neutralizing agent. Since the total time spent by the sulfite-containing condensate in the apparatus is increased, further oxidation of the sulfite ions to sulfate ions is to a great extent completed before the condensate is passed into the sewerage system.

FIG. 4 shows a further preferred embodiment of an inventive apparatus for desulfurizing flue gas in a household firing system, which has proven particularly successful in practical use. Corresponding parts of the apparatus shown in FIG. 4 have the same reference numerals as those of FIGS. 2 and 3. The apparatus of FIG. 4 is particularly suited for improved further oxidation of sulfite to sulfate, at the same time reducing the total apparatus required. In addition, the apparatus of FIG. 4 includes a number of improvements which either improve the degree of desulfurization or facilitate use of the inventive flue gas desulfurization in existing household fuel oil firing systems having conventional chimneys or smokestacks.

The first essential difference between the apparatus of FIG. 4 and that of FIGS. 2 and 3 is the provision of a flue gas bypass in the apparatus of FIG. 4, in the shape of a flap 21 disposed in the waste gas conduit 3 leading from the burner and boiler. This flap is pivotable in the direction of the arrow into the position indicated by a broken line. If the flap 21 is in its position illustrated by the solid line, the apparatus is in normal operation, as shown in FIG. 2, i.e. the waste gases are passed directly to the residual heat exchanger 4 via the conduit 3. If the flap 21 is, on the other hand, in its position illustrated by the broken line, it blocks that portion of the waste gas conduit 3 leading to the residual heat exchanger 4 and the flue or waste gases are passed directly to the conduit 11 leading to a chimney or smokestack. In this case, the waste gases are directed past the residual heat exchanger 4.

This serves to protect the apparatus during operation in summer when the heating system is used only to heat water and not for heating radiators. In this type of operation there is, in particular, no return flow from the radiators through conduit 14 to the residual heat exchanger 4. This means that it is not possible to utilize any residual heat and also not desulfurize any flue gases. When the flap 21 is moved into its position illustrated by a broken line, the side of the residual heat exchanger 4, to which the waste gases pass, is disconnected and no undesired increase in temperature or pressure may occur in the residual heat exchanger.

As illustrated, the waste gas conduit 3 is surrounded in the region of the flap 21 by a pipe 22 of large diameter, which is closed at both ends and forms part of the conduit 11. In this way, the desulfurized waste gases leaving the heat exchanger 4 through the conduit 11 flow around the waste gas conduit 3, through which hot waste gas passes. The waste gases passed to the smokestack or chimney via the conduit 11 are therefore heated in the region of the pipe 22 by the gases flowing through the waste gas conduit 3. The temperature of the waste gases in the conduit 3 may be, for example, about 200° C. When the desulfurized waste gases leave the residual heat exchanger 4 they have a temperature of about 30°

C. Once they have left the pipe 22 they may have a temperature of about 50° C., i.e. an increase of about 20° C. Such an increase in temperature of about 10°–20° C. is sufficient to dry the waste gas, which is desulfurized, undercooled and therefore saturated with water vapour, in the conduit 11. This means that no harmful condensate will form in the smokestack or chimney. In addition, the increase in temperature of the waste gas in the conduit 11 will give the waste gas sufficient uplift and so the smokestack or chimney need not be gas-tight. The described superheating of the undercooled waste gas saturated with water vapour is carried out during normal or winter operation of the heating system.

A further difference between FIGS. 2 and 3, on the one hand, and FIG. 4, on the other, is that the apparatus of FIG. 4 has no condensate collecting tank 6. Instead, the condensate collects on the bottom of the residual heat exchanger 4 in a sump region 23. The conduit 5 leaves from one side of this sump region and conduit 15 from the other. This sump region 23 represents not only a simplification of the apparatus but is also advantageous for the heat balance of the entire firing system. In the embodiments of FIGS. 2 and 3, it is necessary to have a good outer heat insulation on the collecting tank 6 and a good inner heat exchange with the heating return flow in order to supply the heating system with heat from the recirculating condensate. In the apparatus of FIG. 4, all this takes place in the residual heat exchanger 4.

As further illustrated in FIG. 4, air is supplied directly to the suction side of the condensate pump 7 via the conduit 13. It is thereby possible to add to the condensate recirculation system (conduits 5, 8 and 18) the correct amounts of air required for further oxidation of the sulfite. As illustrated, the conduit 13 feeds an air injection nozzle 24, the opening of which has a small cross section and which is disposed in the condensate conduit 5. This provides the condensate with small, particularly numerous air bubbles which establish an extensive surface contact with the condensate and thereby a good exchange of oxygen.

The conduit 13 may be open to the atmosphere so that the flow of condensate in the conduit 5 sucks in air via the nozzle 24. In another embodiment, the conduit 13 may be connected to a blower provided on the burner 1 (FIG. 1). This means that the air pressure of the blower prevails in the conduit 13 and this forces air out of the nozzle 24.

The condensate pump 7 which is directly connected to the output side of the nozzle 24 also brings about a reduction in the size of the air bubbles, which have coalesced in the meantime, and thereby an additional thorough mixing of the condensate with air.

The condensate recirculation conduit 8 has ascending conduit portions 25, 26 which include an upwardly directed flow and, as illustrated in FIG. 4, shutters 27 and 28 which narrow the cross section of these conduit portions. This also causes the air bubbles carried in the condensate to be reduced in size and mixed thoroughly with the condensate which will favourably influence the further oxidation of $SO_3$.

The arrangement of the air injection nozzle 24, the close interconnection of this nozzle with the suction side of the pump 7 and the arrangement of the shutters 27, 28 effect, altogether, such an intensive transfer of oxygen from the air to the sulfite-sulfate solution that the rapid oxidation which normally occurs only at a pH value of 5 to 5.5 will also take place at a pH value of between 6.5 and 7.5. In this way, a "neutral mode of operation" is possible. This means that the advantages of an acid mode of operation, namely and in particular a high degree of sulfatization, are coupled with the advantages of an alkaline mode of operation, namely protection of the apparatus against corrosion, in particular the residual heat exchanger 4.

Finally, FIG. 4 also illustrates schematically the possibility of distributing the condensate particularly evenly within the residual heat exchanger 4. For this purpose, the residual heat exchanger 4 is provided at the top with an intermediate floor 29 for the condensate arriving from conduit 8. From the intermediate floor 29, the condensate is distributed uniformly to the outside surfaces of the conduit portions for the heating return flow, these conduit portions being connected with the conduit 14. The waste gas from the conduit 3 flows around the conduit portions uniformly supplied with condensate in such a way that the sulfur can pass into the condensate. It has been found that, due to such an even distribution of the condensate, the degree of desulfurization realized in the residual heat exchanger 4 may be over 90%.

Another possibility of evenly distributing the condensate within the residual heat exchanger 4 is to have the condensate supplied to the residual heat exchanger via nozzles, in particular flat fan spray nozzles, and for it to be sprayed uniformly onto the heat exchanger surfaces.

What is claimed is:

1. A process for separating sulfur dioxide from flue gas in household fuel oil firing systems having a fuel oil burner, a boiler heated by said burner, a heating water return conduit and a residual heat exchanger connected to the output side of said boiler for cooling said flue gas to about 30°–35° C. and heating thereby the water in said return conduit, said residual heat exchanger forming condensate water in cooling said flue gas, comprising the steps of:
   dissolving the sulfur dioxide in the form of sulfite solely in said condensate water formed in said residual heat exchanger without additional water supply;
   adding a neutralising agent to said condensate water containing said sulfite to bring the pH of said condensate water in the range of 5 to 8;
   recirculating said neutralised condensate water by a pump to the residual heat exchanger for the purpose of avoiding formation of acid condensate water and dissolving further sulfur dioxide;
   introducing air into said recirculated condensate water to convert the dissolved sulfite to sulfate;
   diluting the recirculating condensate with water once it reaches a predetermined sulfate concentration; and
   exhausing said diluted surplus condensate water containing said sulfate.

2. Method as defined in claim 1, in particular for household fuel oil firing systems, characterized in that the sulfate-containing condensate is diluted with waste water before being passed into the sewerage system.

3. Method as defined in claim 1, characterized in that MgO, CaO or NaOH are used as neutralizing agents.

4. Method as defined in claim 1, characterized in that for further oxidation from sulfite to sulfate the condensate is passed into a buffer tank and diluted with water.

5. Method as defined in claim 1, characterized in that sulfate is separated out prior to the condensate being diluted with water.

* * * * *